(12) United States Patent
Vogel et al.

(10) Patent No.: US 9,906,039 B2
(45) Date of Patent: Feb. 27, 2018

(54) POWER SYSTEM FOR MULTIPLE POWER SOURCES

(71) Applicants: John Anthony Vogel, Charlton, NY (US); Eoin Connolly, Slingerlands, NY (US)

(72) Inventors: John Anthony Vogel, Charlton, NY (US); Eoin Connolly, Slingerlands, NY (US)

(73) Assignee: Combind Energies, LLC, Latham, NY (US)

( * ) Notice: Subject to any disclaimer, the term of this patent is extended or adjusted under 35 U.S.C. 154(b) by 0 days.

(21) Appl. No.: 15/209,707

(22) Filed: Jul. 13, 2016

(65) Prior Publication Data

US 2016/0322828 A1    Nov. 3, 2016

Related U.S. Application Data (63) Continuation-in-part of application No. 14/194,773, filed on Mar. 2, 2014, now Pat. No. 9,413,271.

(Continued)

(51) Int. Cl.
*H02J 3/38* (2006.01)
*H02M 3/28* (2006.01)
(Continued)

(52) U.S. Cl.
CPC .............. *H02J 3/383* (2013.01); *H02J 3/386* (2013.01); *H02J 3/387* (2013.01); *H02J 7/0052* (2013.01);
(Continued)

(58) Field of Classification Search
CPC .. H02J 3/383; H02J 3/386; H02J 3/387; H02J 7/0052; H02J 7/0068; H02M 3/04; H02M 7/44
See application file for complete search history.

(56) References Cited

U.S. PATENT DOCUMENTS 6,311,279 B1   10/2001  Nguyen
6,375,924 B1    4/2002  Towler et al.
(Continued)

OTHER PUBLICATIONS

Pham, "USPTO Non-Final Office Action", related to U.S. Appl. No. 14/194,773, dated Dec. 4, 2015.
(Continued)

*Primary Examiner* — Emily P Pham
(74) *Attorney, Agent, or Firm* — Justin W. McCabe, Esq.; Dunkiel Saunders Elliott Raubvogel & Hand, PLLC (57) ABSTRACT

A voltage booster allowing for increased utilization of low voltage, high current, unregulated DC power ("LVDC source"), such as, but not limited to, fuel cells, batteries, solar cells, wind turbines, and hydro-turbines. LVDC generation systems employing a variable low voltage DC-DC converter of the present disclosure may be used without a power inverter in applications requiring high voltage DC inputs and can also allow for the employment of common, low cost, reliable, low voltage energy storage chemistries (operating in the 12-48VDC range) while continuing to employ the use of traditional inverters designed for high voltage power supplies. An embodiment of the DC boost converter includes a plurality of interleaved, isolated, full-bridge DC-DC converters arranged in a Delta-Wye configuration and a multi-leg bridge.

26 Claims, 9 Drawing Sheets

Related U.S. Application Data (60) Provisional application No. 61/781,965, filed on Mar. 14, 2013.

(51) Int. Cl.
*H02J 7/00* (2006.01)
*H02M 3/337* (2006.01)

(52) U.S. Cl.
CPC ............ *H02J 7/0068* (2013.01); *H02M 3/285* (2013.01); *H02M 3/3376* (2013.01); *Y02E 10/76* (2013.01)

(56) References Cited

U.S. PATENT DOCUMENTS

| | | | |
|---|---|---|---|
| 6,452,815 B1 * | 9/2002 | Zhu | ............... H02M 1/34 363/17 |
| 6,882,063 B2 | 4/2005 | Droppo et al. | |
| 6,930,897 B2 | 8/2005 | Jungreis et al. | |
| 6,944,033 B1 | 9/2005 | Xu et al. | |
| 7,382,113 B2 | 6/2008 | Wai et al. | |
| 7,518,886 B1 | 4/2009 | Lai et al. | |
| 7,602,626 B2 | 10/2009 | Iwata et al. | |
| 2002/0106537 A1 | 8/2002 | Saito | |
| 2002/0182462 A1 | 12/2002 | Ballantine et al. | |
| 2006/0152085 A1 * | 7/2006 | Flett | .......................... B60L 9/30 307/75 |
| 2008/0118800 A1 | 5/2008 | Devriendt et al. | |
| 2008/0152969 A1 | 6/2008 | Poonamallee et al. | |
| 2012/0091817 A1 * | 4/2012 | Seymour | ................. H02J 3/383 307/82 |
| 2012/0326516 A1 * | 12/2012 | Gurunathan | .............. H02J 1/00 307/72 |
| 2014/0058572 A1 | 2/2014 | Stein et al. | |

OTHER PUBLICATIONS

Pham, "USPTO Notice of Allowance and Fee(s) Due", related to U.S. Appl. No. 14/194,773, dated Apr. 5, 2016.
Takeuchi, "USPTO Office Action", related to U.S. Appl. No. 14/142,873, dated Jul. 20, 2016.
Masinick, "USPTO Non-Final Office Action", related to U.S. Appl. No. 14/083,787, dated Feb. 14, 2017.
Takeuchi, "USPTO Final Office Action", related to U.S. Appl. No. 14/142,873, dated Apr. 13, 2017.
Thomas, "USPTO Non-Final Office Action", related to U.S. Appl. No. 14/210,213, dated Jan. 25, 2017.

\* cited by examiner

POWER SYSTEM FOR MULTIPLE POWER SOURCES

RELATED APPLICATION DATA

This application is a continuation-in-part of U.S. patent application Ser. No. 14/194,773, filed Mar. 2, 2014 and titled "Power Conversion System with a DC to DC Boost Converter" and claims the benefit of priority of U.S. Provisional Patent Application No. 61/781,965, filed Mar. 14, 2013, and titled "Power Conversion System with a DC to DC Boost Converter", each of which is incorporated by reference herein in its entirety.

FIELD OF THE INVENTION

The present invention generally relates to the field of power electronics. In particular, the present invention is directed to a Power System for Multiple Power Sources.

BACKGROUND

There are many devices that either produce variable low voltage DC power (below 100 VDC) or require low voltage DC power. A common example of a low voltage DC power source is a fuel cell, which is an electrochemical device which reacts hydrogen with oxygen to produce electricity and water. The basic process is highly efficient, and fuel cells fueled directly by hydrogen are substantially pollution free. Yet, the output of fuel cells (variable low voltage, high current DC power) makes efficient engineering solutions difficult, especially in residential and light commercial applications, where the power output demands of a fuel cell are not as significant. While sophisticated balance-of-plant systems are used for optimizing and maintaining relatively low power capacity applications, they do not effectively meet residential and light commercial power needs and at least a portion of this failure is attributable to the lack of effective power electronics to pair with low voltage DC power sources and loads.

For some low voltage DC sources such as fuel cells and batteries, the power conversion efficiency degrades over time as the sources are depleted. For example, for fuel cells, the fuel cell stack produces variable low-voltage DC based on power demand and the stack's average voltage degrades over time based on catalyst loss and energy conversion efficiency degradation. Increasing the number of fuel cells running in parallel will increase the output stack voltage, but degradation will still render the system inefficient and possibly unusable in a relatively short amount of time, requiring that the fuel cell stack be replaced.

SUMMARY

In a first exemplary aspect, a power system for powering one or more loads is described, the power system comprising: a plurality of power sources electronically coupled to the one or more loads and in electronic communication with other ones of the plurality of power sources, and wherein at least one of the plurality of power sources is selected from the list of: a fuel cell stack, a battery, a capacitor, a flow battery, a solar panel, and a wind turbine; a plurality of power conversion systems coupled to a corresponding respective one of the plurality of power sources and wherein each of said plurality of power conversion system includes: a DC to DC boost converter (DDBC) for converting power received from the power source, the DDBC having a plurality of interleaved, isolated, full-bridge DC-DC converters arranged in a Delta-Wye configuration and a multi-leg bridge.

In another exemplary aspect, a power system for powering one or more loads is described, the power system comprising: a plurality of power sources electronically coupled to the one or more loads and in electronic communication with other ones of the plurality of power sources, and wherein at least one of the plurality of power sources is a fuel cell stack and wherein at least one other one of the plurality of power sources is selected from the list of: a battery, a capacitor, a solar panel, and a wind turbine; a plurality of power conversion systems coupled to a corresponding respective one of the plurality of power sources and wherein each of the plurality of power conversion system includes: a DC to DC boost converter (DDBC) for converting power received from the power source, the DDBC having a plurality of interleaved, isolated, full-bridge DC-DC converters arranged in a Delta-Wye configuration and a multi-leg bridge; and a system controller configured to monitor the total system load required by the one or more loads and to apportion the total system load across the individual power sources by communicating with and coordinating the other power control systems.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
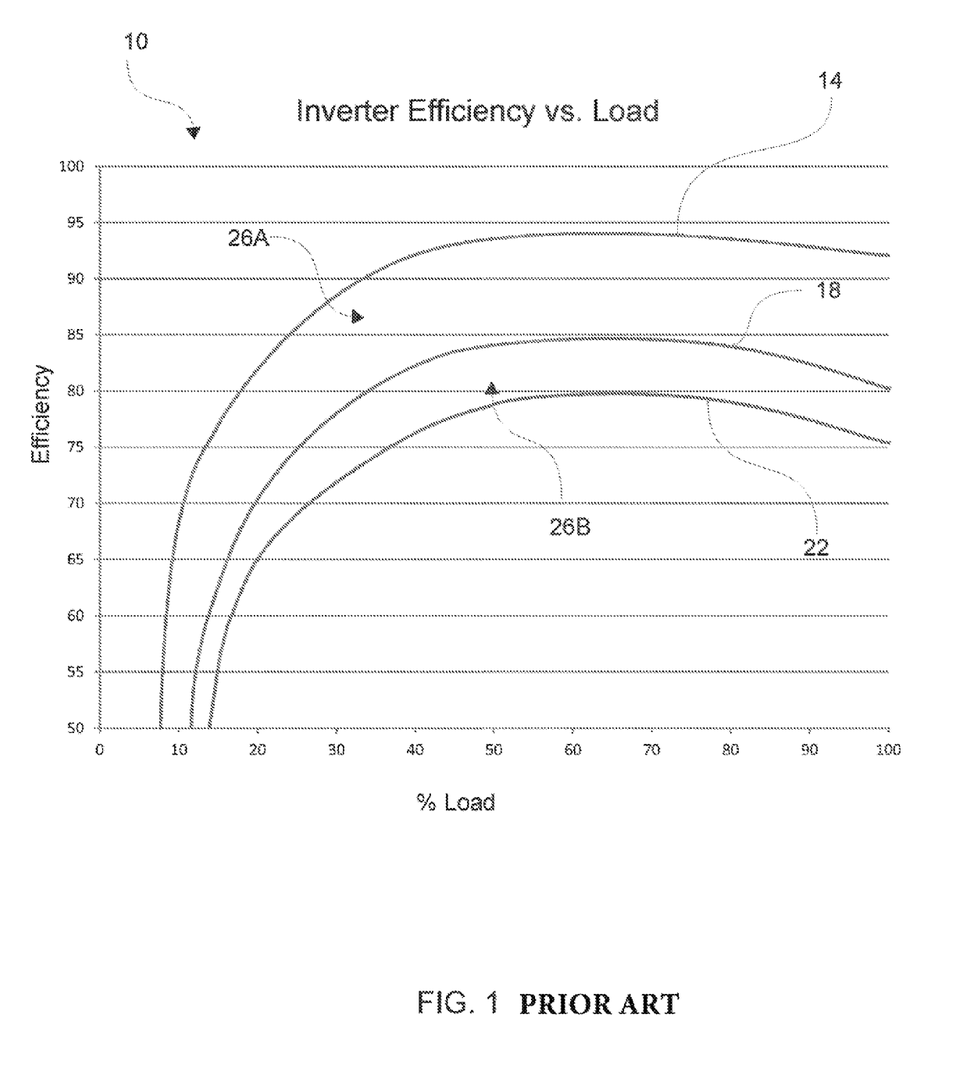
FIG. 1 is a graph of commercial inverter efficiency versus load percentage for DC sources.

There are many DC power sources that produce low voltage, high current, unregulated DC power ("LVDC source"). However, many of these LVDC sources are relatively incompatible with commercially available inverters insofar as their efficiencies and usefulness are impeded by the high input voltage required for efficient operation of these types of inverters. As an example of this phenomenon, FIG. 1 shows a graph 10 of inverter efficiency versus load percentage for a solar power source, i.e., a high voltage source, and a LVDC source, where a traditional inverter is used, i.e., one typically designed to receive high voltage inputs. As shown, the power conversion efficiency of power coming from the solar source varies as a function of load and is represented by solar voltage input 14. Solar voltage input 14 reaches a maximum, in this example, of about 93% conversion at between about 50 and 75 percent of maximum load. In comparison, the power conversion efficiency of the LVDC source at its beginning of life (BOL) (represented by BOL voltage input 18) is considerably less. At its peak, the LVDC source obtains an efficiency of about 85% at between about 65 and 75 percent of maximum load. Moreover, as the LVDC source ages, there is an even greater disparity in power conversion when compared to the solar source. At the end of life (EOL) (represented by EOL voltage input 22) of LVDC sources, the power conversion efficiency peaks at about 70% at 70% maximum load.

The differences between the voltage inputs are designated as loss areas 26, i.e., loss area 26A and B, and represent inefficiencies in conversion of power. Loss area 26A is the difference between solar voltage input 14 and BOL voltage input 18 and loss area 26B is the difference between solar voltage input 14 and EOL voltage input 22. Loss area 26B is greater than loss area 26A because while solar voltage input 14 may decrease over time, the longevity of the solar source far surpasses that of LVDC power sources, such as batteries and fuel cells. The difference between BOL voltage input 18 and EOL voltage input 22 is largely due to the decreased ability for the LVDC source to generate sufficiently high output voltages to reduce inefficiencies related to the use of inverters designed for high voltage power sources.

A variable low voltage DC-DC converter according to present disclosure allows for improved and increased use of numerous power sources, such as, but not limited to, fuel cells, batteries, solar cells, flow batteries, wind turbines, and hydro-turbines. The variable low voltage DC-DC converter allows for optimization of a distributed generation system including a LVDC source and an energy storage device for efficiency, life expectancy and cost without being limited to high voltage outputs from the LVDC source. LVDC generation systems employing a variable low voltage DC-DC converter of the present disclosure may be used without a power inverter in applications requiring high voltage DC inputs, such as a vehicle or other battery charger, a heater, a welder, a motor starter, a motor, a high voltage DC (HVDC) utility application, a telecommunications equipment, a vehicle, a tractor, a marine auxiliary power, and a material handling equipment. A variable low voltage, bi-directional DC-DC converter according to the present disclosure can also allow for the employment of common, low cost, reliable, low voltage energy storage chemistries (operating in the 12-48VDC range) while continuing to employ the use of traditional inverters designed for high voltage power supplies. The variable low voltage DC-DC converter also can simplify the design (by reducing components required) and increase the useful life of the LVDC sources while allowing for efficient charging and discharging to a high voltage DC application.

Additionally, incorporating LVDC power storage with highly efficient generating sources such as fuel cells, solar or wind increases the economic viability of the generating device by capturing more useable energy and allowing for the use of low cost LVDC power storage employing batteries technologies, such as lead acid batteries. For example, vehicle and residential energy storage systems are dominated by battery chemistries allowing for high voltage storage topologies. Lithium-ion and nickel-metal-hydride are two examples of batteries that operate in the 400-600 VDC range so as to ensure high voltage DC output to commercially available inverters for high efficiency conversion. High voltage storage topologies are expensive and can only accept power at certain voltages. Use of a variable low voltage DC-DC converter allows for use of produced power at lower voltages to be stored within the batteries as well as the use of lower cost batteries, such as lead acid.

Figure 2:
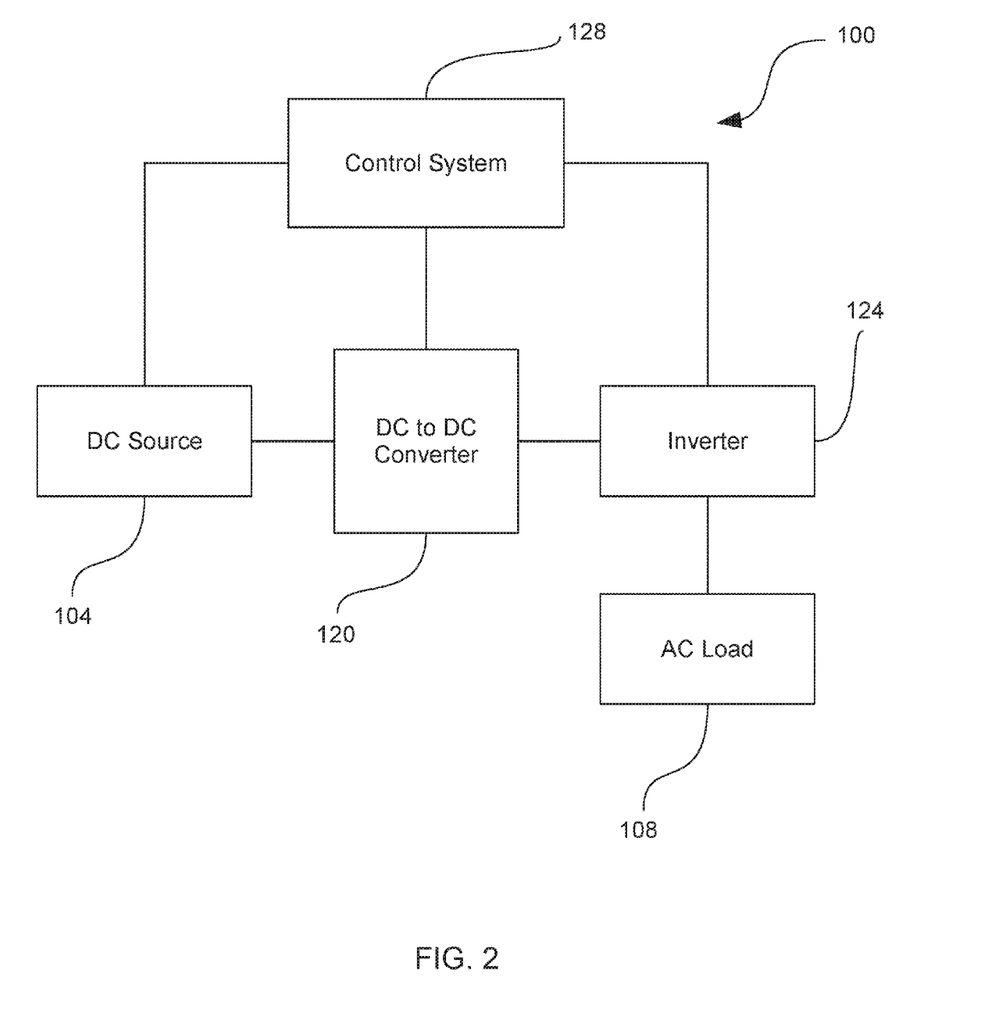
FIG. 2 is a block diagram of a power conversion system according to an embodiment of the present invention.

Referring now to FIG. 2, a high-level block diagram of a power conversion system 100 is shown that converts a variable low DC voltage from a DC source 104 into an AC voltage for an AC load 108. Examples of a DC source 104 can include a variety of variable DC power sources that are typically subject to low voltage cutoffs, such as, but not limited to, a solar array, a wind turbine, a fuel cell, a flow battery, a water turbine, a battery, and a capacitor. Examples of AC load 108 include, but are not limited to, an electric power grid, a vehicle, and a residence.

As shown in FIG. 2, power conversion system 100 includes a DC-DC boost converter (DDBC) 120, an inverter 124, and a control system 128. As described in more detail below with reference to FIG. 3, DDBC 120 converts variable, low voltage DC to constant, high voltage DC using the high current output of the DC source 104. Once converted to fixed, high voltage DC, the voltage is delivered to inverter 124, which converts the DC voltage to an AC voltage suitable for distribution to AC load 108. The operation of DDBC 120 is regulated by control system 128 that, at a high level controls, among other things, the input current level and a set-point for inverter 124 so as to draw power from the DC source. Control system 128 is described in more detail below with respect to FIG. 4.

Figure 3:
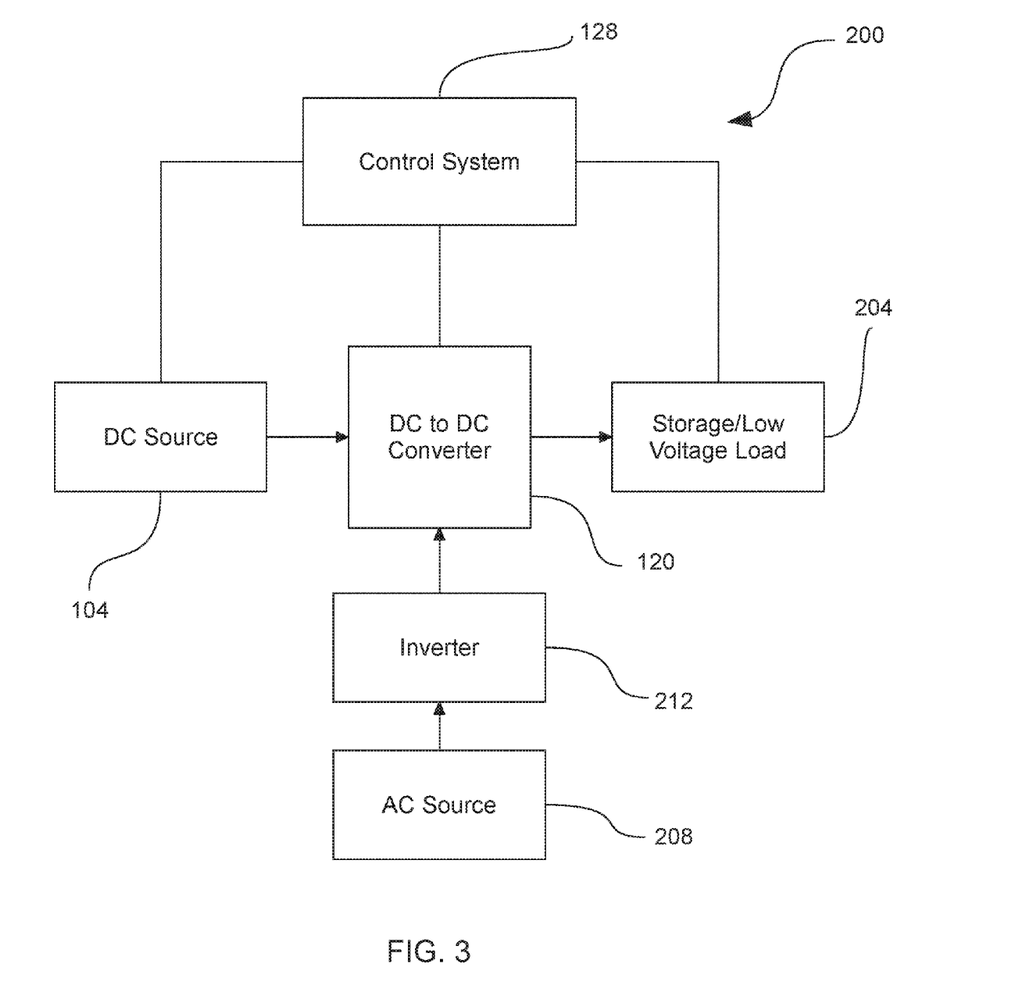
FIG. 3 is a block diagram of another power conversion system according to an embodiment of the present invention.

FIG. 3 shows an alternative embodiment of power conversion system 200 employing a DDBC 120. In this embodiment, power conversion system 200 is designed and configured so as to receive power from both a DC source, i.e., DC source 104, and an AC power source 208 (e.g., the electrical grid). DDBC 120 receives inputs from DC source 104 and AC power source 208 (via inverter 212) and converts the inputs to a low, high current, DC voltage for a low DC voltage storage/load 204. Examples of low DC voltage storage/load 208 include, but are not limited to, an electric vehicle, a material handling equipment (e.g., electric fork-lifts), a tractor, a marine auxiliary power system, and a telecommunications equipment.

As is well known, a DC to DC converter is a species of power converter. Moreover, many power converters can be configured to convert DC into AC (typically called inverters), as well as many other power conversion functions. Thus, DDBC 120 can, in some embodiments, be implemented by a multi-function power converter that is configured to operate as a converter, i.e., convert DC into DC, or inverter, i.e. to convert DC into AC, or rectifier, i.e. to convert AC into DC. However, in some embodiments, DDBC 120 is implemented by a device that can only convert DC into DC, DC into AC or AC into DC.

Figure 4:
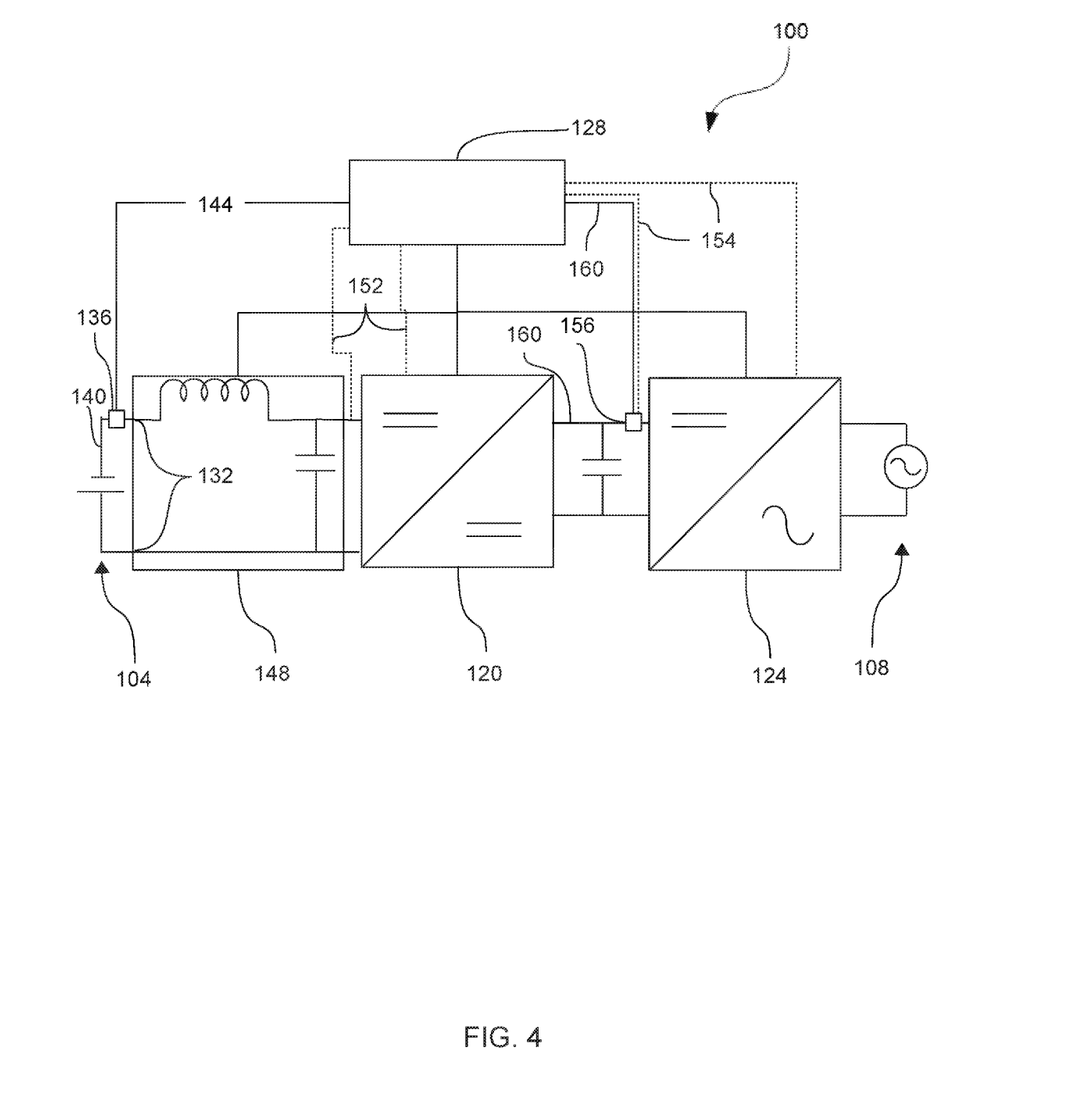
FIG. 4 is a block diagram of another power conversion system according to an embodiment of the present invention.

Turning now to FIG. 4, there is shown a more detailed embodiment of power conversion system 100. In this embodiment, power conversion system 100 includes input terminals 132, allowing mechanical and electrical connection to DC source 104 and the other components of the power conversion system. At the point of power input to DDBC 120 is a sensor 136, which measures an input current 140 coming from DC source 104 and transmits a signal 144, representative of the input current, to control system 128.

Input current 140 is then fed into an input current filter 148. In an exemplary embodiment, input current filter 148 is an inductor/capacitor combination that filters input current 140 to protect DC source 104 from the effects of AC ripple caused by switching of transistors, e.g., MOSFETS (high frequency), and feedback from the grid (low frequency). This AC ripple can cause localized voltage changes in electrodes, which results in increased fuel consumption and loss of efficiency in fuel cells, Faradaic heating in batteries and disruptions in peak power tracking algorithms, thereby leading to loss of efficiency in distributed generation devices.

In an exemplary embodiment, when DDBC 120 is configured as a pulse width modulated (PWM) boost converter, the DDBC receives the filtered current input from input current filter 148 and converts the low voltage DC to high voltage DC in three steps. Power conversion system 100 converts the low voltage DC signal to a low voltage AC signal, then converts the low voltage AC signal to high voltage AC signal, then converts the high voltage AC signal to a high voltage DC signal. Two, interacting control loops are used in conjunction with DDBC 120.

Figure 5:
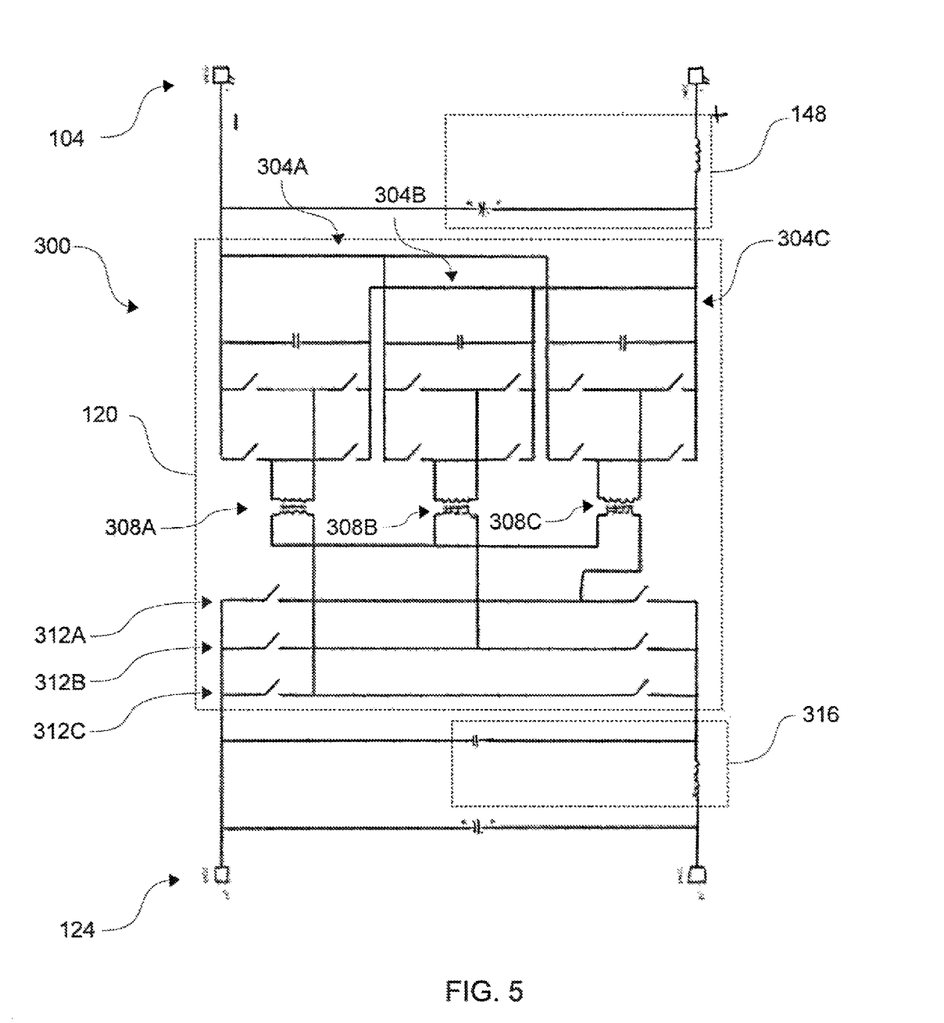
FIG. 5 is an electrical schematic of a DC to DC (DC-DC) boost converter according to an embodiment of the present invention.

For high-power applications, increasing the switching frequency of the transistors (as a part of, for example, MOSFET-based DC-AC converters 304 discussed in more detail below) provides the benefit of reducing the size of associated passive devices included with a DDBC, such as DDBC 120, such as transformers, inductors and capacitors. Size reductions in the aforementioned components beneficially reduce the overall footprint of the device and the cost. However, higher switching frequencies lead to higher switching losses and lower conversion efficiencies. In an exemplary embodiment, of DDBC 120, DDBC 120 controls the switching frequency of the transistors based on operating conditions, thereby allowing the size of passive devices to be minimized while mitigating the effects of switching losses. For example, DDBC 120 can be designed with components sized for maximum power output at maximum switching frequency where the effects of maximum switching loss are minimized, but can also reduce the switching frequency when power demands are lower. This configuration of DDBC 120 can be useful in distributed generation applications where the demand on the power source could remain low, e.g., <20% rated capacity, for extended periods of time as without modification of the switching frequency, switching losses would have an adverse effect on power system efficiency. By reducing the switching frequency as the load on the power sources decreases, switching losses at low loads can be lessened. In an exemplary embodiment, DDBC 120 is configured such that the drop in switching frequency is proportional to the load decrease monitored by the system.

Regulation of the voltage boost provided by DDBC 120 can be accomplished using one or more feedback or control loops. For example, and as shown in FIG. 4, a feedback loop 152 is electronically coupled to DDBC 120 and control system 128. Feedback loop 152, is an inner, fast loop of power conversion system 100, which regulates the voltage boost of the transformers by receiving, as an input, a fixed input voltage signal, representative of the voltage on inverter 124, and adjusting the phase angles of the voltages of the power sent from the DC source on the transformer primary windings (discussed and shown in FIG. 5) by using, for example, phase-shifting modulation technique whose algorithms reside in the microprocessor. The DC source voltage will vary based on several variables including: output current, level of degradation, and control methods such as peak power tracking (PPT) employed by the control system. In one embodiment, feedback loop 152 transmits power at a reference voltage from a power supply (not shown) to the transformer primary windings to adjust the voltage phase angles seen by the transformers; the higher the applied voltage, the lower the duty ratio of the transformers and the lower the voltage boost and vice versa: the lower the applied voltage, the higher the duty ratio and the higher the boost. In another embodiment, feedback loop 152 receives reference voltage power from a dedicated circuit (not shown) that draws power from DC source 104 and fixes its voltage through an additional dedicated transformer arrangement designed especially for this task, such as one with primary windings connected in the delta configuration and secondary windings connected in wye to produce a desired phase-shift.

An output current sensor 156 is coupled between DDBC 120 and control system 128. Output current sensor 156 measures the current exiting DDBC 120 and sends a signal 160 representative of the current to control system 128.

The high DC voltage power generated by DDBC 120 is transmitted to inverter 124 (through an output current filter, such as output filter 316 shown in FIG. 5) for conversion into high voltage AC suitable for introduction to the AC load 108. The amount of power available to AC load 108 is dependent upon, among other things, the available output current of DC source 104. Control over the power draw to AC load 108 can be accomplished using control loop 154, which is electrically coupled to control system 128 and output current sensor 156. In an exemplary embodiment, control loop 154 provides a power draw command to inverter 124 based upon the available output current of DC source 104 (determined from a signal received from output current sensor 156). If DC source 104 cannot meet the power draw command, control system 128 de-rates power conversion system 100. In another exemplary embodiment, control system 128 can sense power demands of AC load 108 (via voltage drop or other indication not shown) and responsively increase demand on DC source 104. In this embodiment, control loop 154 monitors output current sensor 156 to ensure voltage demand is met using DC link capacitors to maintain voltage at a level set by the microprocessor. If the voltage level is not reached, control loop 154 signals to control system 128 that power conversion system 100 needs to be derated.

FIG. 5 shows an embodiment of a DC-DC boost converter, DDBC 300, suitable for use in the power conversion systems described herein. The topology of DDBC 300 can be described as three interleaved, isolated, full-bridge DC-DC converters in a Delta-Wye configuration followed by a synchronous, three-leg bridge. In this embodiment, three phases are used. However, more or fewer phases may be implemented. Splitting the conversion into three phases allows the high current to be spread across multiple legs thereby increasing efficiency and heat dissipation. The figure shows, first, a plurality of MOSFET-based DC-AC converters 304, e.g., 304A-C, that are electrically coupled to an input current filter, such as input current filter 148.

A plurality of transformers 308, e.g., transformers 308A-C, are electrically coupled to the DC-AC converters, such that each transformer is coupled to one or more of the DC-AC converters. Thus, for example, transformer 308A is coupled to DC-AC converter 304A and 304B. Transformers 308 convert the low voltage AC generated by converters to a relatively higher voltage AC. Typically, the number of transformers 308 used in DDBC 300 corresponds to the number of converters 304. The amount of boost provided by DDBC 300 is regulated by the turns ratio of the transformers 308: the higher the turns ratio, the higher the boost. An undesirable side effect of increasing the turns ratio of the transformers is higher flux losses. However, by increasing the number of legs or phases, the duty on each transformer 308 is reduced, and the turns ratio and the flux losses are both lower. Moreover, by interleaving, or summing, the legs after transformers 308, DDBC 300 achieves a higher overall effective boost with minimal flux losses. Also, since the MOSFET-based topology is inherently high switching frequency, the high-frequency transformers 308 have the advantages of being small in size and highly efficient.

Additionally, in grid-tied applications, transformers 308 fulfill the requirement of grid isolation. Isolation requirements take two forms: power and signal. Power isolation is the minimization of DC current injected into the grid and is a stringent requirement of most utilities. Transformerless inverters are being introduced in Europe, which while smaller and lighter than their transformer-based counterparts, these devices suffer from lower efficiencies and additional components to prevent DC leakage onto the grid. Signal isolation is the separation of generation-side measurements from the grid to ensure critical parameter measurement accuracy. The integration of small, highly efficient high-frequency transformers, such as transformer 308, fulfills all isolation requirements with a topology solution whose complexity and cost is less than a transformerless topology.

The high voltage AC output by transformers 308 is fed to a corresponding number of synchronous rectifiers 312, e.g., 312A-C. Synchronous rectifiers 312 convert the high voltage AC from transformers 308 to high voltage DC. In an exemplary embodiment, synchronous rectifiers 312 are MOSFET-based rectifying devices. Typically, the number of synchronous rectifiers 312 included with DDBC 300 is the same as the number of transformers; however, more or fewer may be used. As shown in FIG. 5, three MOSFET-based synchronous rectifiers are electrically coupled to transformers 308. Before the output of DDBC 300 is provided to an inverter, such as inverter 124. it can pass through an output filter 316. Output filter 316 protects the power conversion system from AC ripple from the electrical grid (if so coupled). AC ripple from the electrical grid will affect the performance of the power conversion system inductors, capacitors, switches and the low voltage DC source, e.g., fuel cell.

Overall, a power conversion system including DDBC 300 is based on a boost topology which features continuous output current, a voltage ratio less than one, and discontinuous input current. AC-DC converters 304 are operated in parallel to help distribute dissipated heat, lower the switch RMS current, and enable soft switching features. AC-DC converters 304 are also interleaved in such fashion that when one phase stops conducting current and its phase transformer freewheels, another phase starts or already is conducting current. Current is thereby spread across all phases. Input current is always pulsed. A noted benefit of this topology is that power conversion efficiency increases as the input voltage decreases. This is counter to most power electronics behavior which is just the opposite, conversion efficiency increases as voltage increases due to a reduction in resistive losses. However, the topology described herein requires higher performance, and therefore an increased duty ratio on the switching devices, leading to reduced switching losses that outweigh an increase in resistive losses due to lower input voltage.

For DDBC 300, the input currents of all three phases sum, thus, depending on the operational mode the total input current could be found either between zero and one phase current (which is n×the output current) or between one and two phase currents; hence, the total input current resembles that of a multilevel converter. The system will include at least two control loops, as described above, which will regulate both the output current and output voltage.

Benefits of the average current control method are infinite DC gain, better control of inductor current, and immunity to noise. A lack of inherent peak current capability is a disadvantage of this control method, along with a limited current loop bandwidth characteristic to linear control systems.

Power conversion system 100 as described herein greatly extends the range over which a DC source, such as DC source 104, can operate. For example, using power conversion system 100 enables a fuel cell system to continue to provide power to a utility grid closer as the output voltage of the fuel cell system decreases over time.

Control system 128 is designed and configured to manage the components of power conversion systems 100 (FIGS. 2 and 4) or 200 (FIG. 3) by collecting information from inputs internal and external to the system, such as, but not limited to sensed input voltage, sensed input current, output voltage set point, and heat sink temperature. Information collected by control system 128 is input into programmed algorithms, set points, or lookup tables so as to determine operating parameters for power conversion system 100, components, such as DDCB 120, control signals, feedback loops and/or to generate external data for use in evaluating the efficiency, lifespan, or diagnosing problems with the power conversion system. Although control system 128 is presently described as a separate component of power conversion system 100, it is understood that control system 128 can be dispersed among the various components described herein without affecting the function of the power conversion system.

Figure 6:
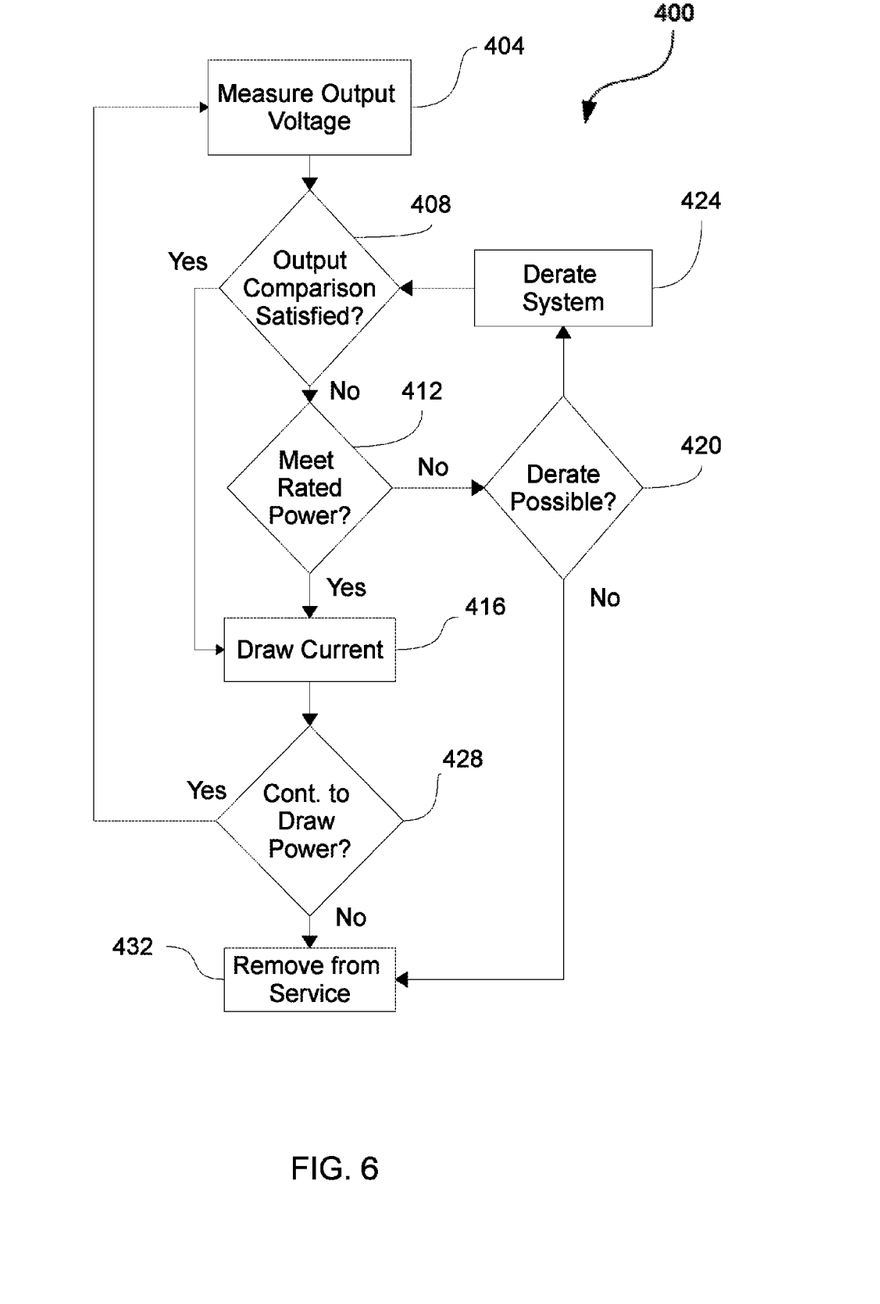
FIG. 6 is a process diagram of providing high voltage DC power to a load from a low voltage DC power source.

Turning now to an exemplary operation 400 of a power conversion system, such as power conversion system 100, and with reference to exemplary embodiments shown in FIGS. 1-4 and in addition with reference to FIG. 6.

At step 404, measure the output voltage of the DC source, such as DC source 104. Measurement of the output voltage may be via a sensor, such as sensor 136, which is capable of transmitting a signal representative of the voltage to a control system, such as control system 128.

At step 408, the measurement from step 404 is compared to prior measurement of the output voltage, an initial voltage output value (at initial commissioning, the DC source, such as a fuel cell stack, will have its highest beginning of life (BOL) voltage curve for power output), a maximum power output value (as determined in step 420 discussed below) or a predetermined set-point or threshold value. If the output voltage measured in step 404 has decreased below a certain percentage (when compared to a prior measurement or the initial voltage output value) or has fallen below the predetermined set-point or threshold value, method 400 proceeds to step 412; otherwise, the method proceeds to step 416.

At step 412, a determination is made as to whether the DC source can increase its current output so as to meet the rated power output of the DC source. If the DC source can increase its current output, the method proceeds to step 416; if not, the method proceeds to step 420.

At step 416, current is drawn from a DC source into the power conversion system at a value sufficient to supply the inverter, such as inverter 124, with sufficiently high DC voltage to efficiently operate the inverter. Process 400 then returns to step 404 to remeasure the output voltage of the DC source. Notably, use of a power conversion system, such as power conversion system 100, and especially DDBC's described herein, can allow for a significant drop in DC source output voltage (in comparison to an initial voltage output value) and still provide sufficient power to the inverter. In an exemplary embodiment, the voltage drop from a commissioned value of the DC power source can be as much as 80%.

At step 420, if sufficient current cannot be drawn from the DC source to effectively operate the inverter, it is determined whether or not the power conversion system can be derated such that the maximum power output of the system is based on maximum voltage sustainable by the DC source. Sufficient current to maintain the voltage may be unavailable because other balance-of-plant-components of the DC source, such as the stack air supply blower or the waste heat rejection loop of a fuel cell power system, limit the output of the DC source. If the power conversion system cannot be derated, the system is removed from service. Otherwise, the power conversion system is derated at step 424 such that a maximum power output of the DC source is transmitted to step 408 for further comparisons between the actual output voltage measured in step 404.

At step 428, a determination is made as to whether or not the DC source can continue to supply power to the inverter in an amount suitable to efficiently run the inverter. If not, the DC source is taken out of service at step 432 and the DC source is replaced or recharged. If the DC source can provide a suitable power output to efficiently run the inverter, process 400 returns to step 404.

A power conversion system as described herein allows for: optimization of a fuel cell, energy storage, and distributed generation system for efficiency, life and cost instead of voltage output; recovery, use and/or storage of additional power from these devices that until now would be unobtainable; increasing the useable life of the DC source portion of the system, e.g., a fuel cell stack, a battery string, a solar panel, a flow battery, a wind turbine or a water turbine; allowing DC sources to be used without an inverter stage in applications requiring high voltage DC inputs, e.g., a vehicle or other battery charger, a heater, a welder, a motor starter, a motor, a high voltage DC (HVDC) utility application, telecommunications equipment, a vehicle, a tractor and/or a marine auxiliary power, a material handling equipment; or providing additional power and life to improve the economics of the distributed power generation systems. Additionally, the bi-directional capability of the device allows for the implementation of low voltage battery storage, charged by relatively high power sources allowing for the employment of readily available, low cost, reliable energy storage systems such as lead acid battery.

Figure 7:
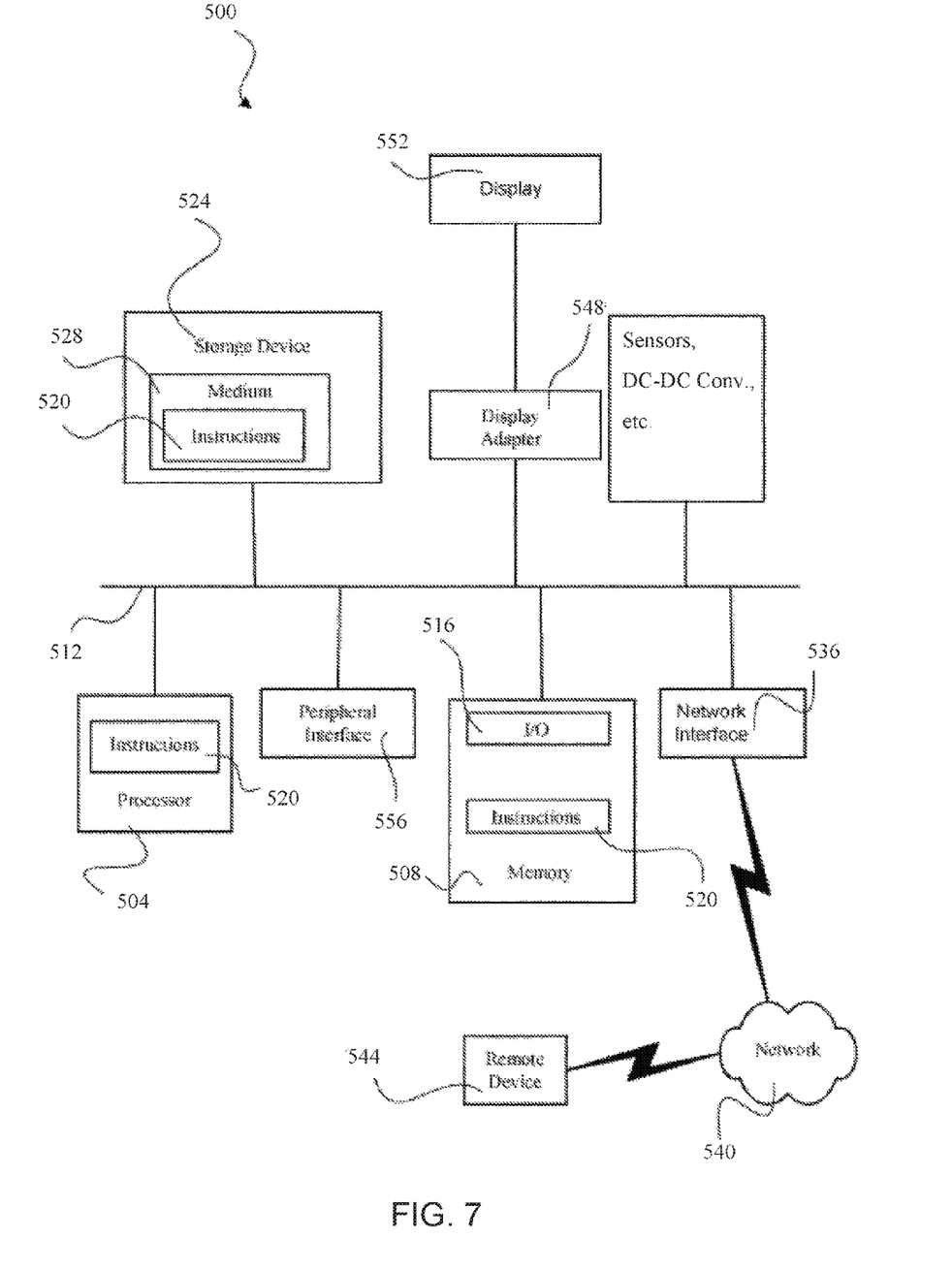
FIG. 7 is a block diagram of a computing system suitable for use with a DC-DC boost converter according to embodiments of the present invention.

FIG. 7 shows a diagrammatic representation of one implementation of a machine/computing device 500 that can be used to implement a set of instructions for causing one or more control systems of power conversion system 100, for example, control system 128, to perform any one or more of the aspects and/or methodologies of the present disclosure. Device 500 includes a processor 504 and a memory 508 that communicate with each other, and with other components, such as DDBC 120 and inverter 124, via a bus 512. Bus 512 may include any of several types of communication structures including, but not limited to, a memory bus, a memory controller, a peripheral bus, a local bus, and any combinations thereof, using any of a variety of architectures.

Memory 508 may include various components (e.g., machine-readable media) including, but not limited to, a random access memory component (e.g, a static RAM "SRAM", a dynamic RAM "DRAM", etc.), a read-only component and any combinations thereof. In one example, a basic input/output system 516 (BIOS), including basic routines that help to transfer information between elements within device 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Device 500 may also include a storage device 524. Examples of a storage device (e.g., storage device 524) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD), a solid-state memory device and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 524 may be removably interfaced with device 500 (e.g., via an external port connector (not shown)). Particularly, storage device 524 and an associated machine-readable medium 528 may provide nonvolatile and/or volatile storage of machine-readable instructions, data structures, program modules, and/or other data for control system 128. In one example, instructions 520 may reside, completely or partially, within machine-readable medium 528. In another example, instructions 520 may reside, completely or partially, within processor 504.

Device 500 may also include a connection to one or more sensors, such as sensor 136 and/or output current sensor 156. Sensors may be interfaced to bus 512 via any of a variety of interfaces (not shown) including, but not limited to, a serial interface, a parallel interface, a game port, a USB interface, a FIREWIRE interface, a direct connection to bus 512, and any combinations thereof. Alternatively, in one example, a user of device 500 may enter commands and/or other information into device 500 via an input device (not shown). Examples of an input device include, but are not limited to, an alpha-numeric input device (e.g., a keyboard), a pointing device, a joystick, a gamepad, an audio input device (e.g., a microphone, a voice response system), a cursor control device (e.g., a mouse), a touchpad, an optical scanner, a video capture device (e.g., a still camera, a video camera), touchscreen, and any combinations thereof.

A user may also input commands and/or other information to device 500 via storage device 524 (e.g., a removable disk drive, a flash drive) and/or a network interface device 536. A network interface device, such as network interface device 536, may be utilized for connecting device 500 to one or more of a variety of networks, such as network 540, and one or more remote devices 544 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices and any combinations thereof. A network, such as network 540, may employ a wired and/or a wireless mode of communication. In general, any network topology may be used. Information (e.g., data, instructions 520, etc.) may be communicated to and/or from device 500 via network interface device 544.

Device 500 may further include a video display adapter 548 for communicating a displayable image to a display device 522. Examples of a display device 522 include, but are not limited to, a liquid crystal display (LCD), a cathode ray tube (CRT), a plasma display, and any combinations thereof.

In addition to display device 522, device 500 may include a connection to one or more other peripheral output devices including, but not limited to, an audio speaker, a printer and any combinations thereof. Peripheral output devices may be connected to bus 512 via a peripheral interface 556. Examples of a peripheral interface include, but are not limited to, a serial port, a USB connection, a FIREWIRE connection, a parallel connection, a wireless connection, and any combinations thereof.

A digitizer (not shown) and an accompanying pen/stylus, if needed, may be included in order to digitally capture freehand input. A pen digitizer may be separately configured or coextensive with a display area of display device 552. Accordingly, a digitizer may be integrated with display device 552, or may exist as a separate device overlaying or otherwise appended to display device 552.

Figure 8:
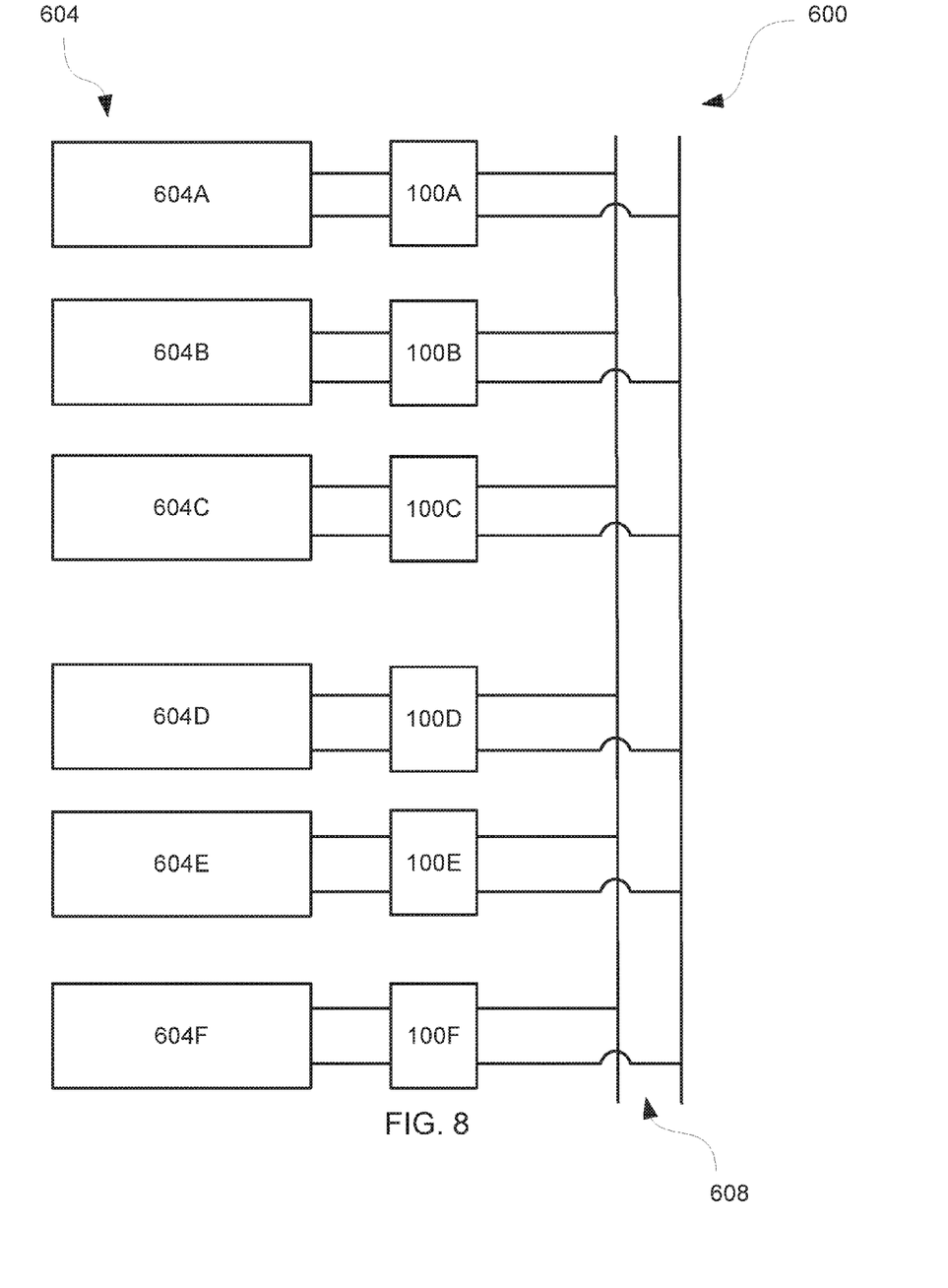
FIG. 8 is a block diagram of a power system according to an embodiment of the present invention.

Turning now to a discussion of FIG. 8, there is shown an exemplary power generation and storage system 600 (hereinafter referred to as "power system 600") according to an embodiment of the present disclosure. Power system 600 includes a plurality of independent power sources 604, which can be, but are not limited to, fuel cells, flow batteries, solar panels, batteries, capacitors, and wind turbines. Coupled to each of these power sources 604 (or groups of power sources, such as a solar panel array or a plurality of wind turbines) is a power conversion system, such as power conversion system 100, which is then coupled to a bus 608 for transmission of electrical power to a load or the reception of electrical power. For example, and as shown in FIG. 8, three fuel cells (power sources 604A-604C), two battery banks (power sources 604D and 604E), and one solar array (power source 604F) are coupled to power conversion systems 100A-100F, respectively. Each power conversion system 100A is then coupled to bus 608. As described in more detail below, when there is a demand for power, one or more of the power sources 604 are employed to deliver power to the load and, concomitantly or after, provide recharge power to the battery banks.

In an exemplary embodiment, power system 600 is designed and configured to maximize fuel cell stack/module life, maximize overall system efficiency, and minimize operating expense of the power system. Power system 600 achieves these outcomes by employing the exemplary control strategy 700 shown in FIG. 9.

Figure 9:
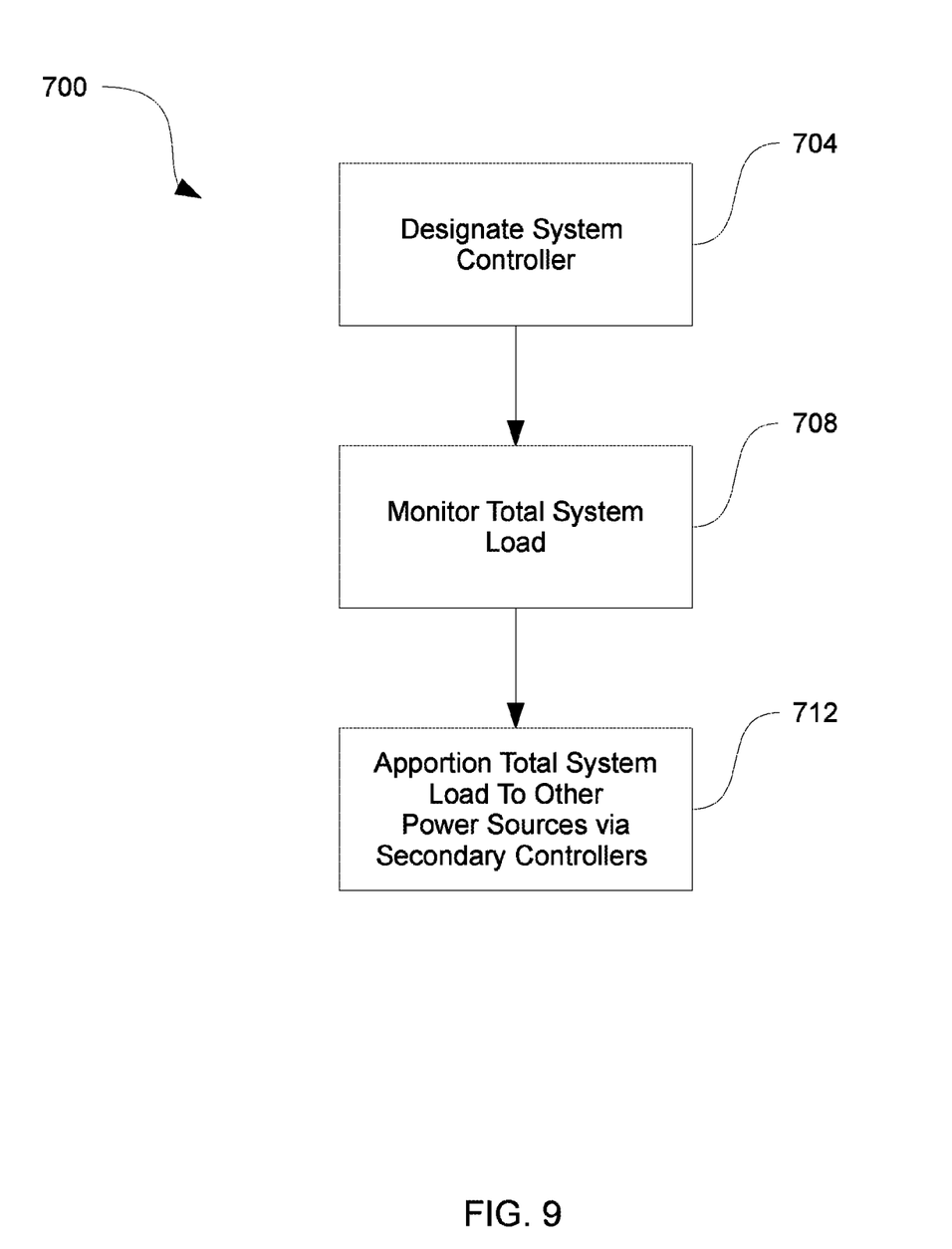
FIG. 9 is a process diagram of a control strategy suitable for use with a power system according to an embodiment of the present invention.

At a high level, control strategy 700 dynamically operates and assigns load contributions from a power system, such as power system 600, based on individual stack/module condition, performance, cumulative runtime and number of stack/module start/stop sequences.

At step 704, a system controller is designated from amongst a plurality of power control systems, such as power control system 100, in use by the power system. In an exemplary embodiment, each power source or a collection of power sources includes a power control system with one of those power control systems or an additional power control system being designed a system control.

At step 708, the system control monitors total system load. In an exemplary embodiment, total system load can be determined by monitoring the current required by the load that is coupled to a power system, such as power system 600.

At step 712, the system control apportions the total system load across the individual power sources by communicating with and coordinating the other power control systems (hereinafter, referred to as, "secondary controllers"). Depending on the monitored total system load, the system control may also control whether and which power sources are switched in/out from the bus. Moreover, the system control may control the sequencing of the power sources so that different ones of the power sources are switched in/out of operation. Control over sequencing can be valuable when dealing with a power source such as a battery or fuel cells, whose useful life is impacted by use and extent of use.

Control strategy 700 assists in maximizing power source life, especially when the power source is a fuel cell stack/module, maximizing overall system efficiency, and minimizing total operating expense of the power source. For example, control strategy 700 can operate a plurality of power sources, such as a group of fuel cells, by for example, operating the fuel cells according to the load and, preferably (and if possible given the load), avoiding operating the fuel cells inefficiency. If other power sources are available, e.g., a battery, control strategy 700 may use the power available in the battery to avoid running the fuel cells inefficiently.

In an exemplary embodiment, a control strategy, such as control strategy 700, when used in conjunction with a power system, such as power system 600, can control the prioritization and load contribution of other power source/storage assets (batteries, ultra-capacitors, solar, wind, etc.). Prioritization can extend the useful life of power sources and ensure that power sources are being used efficiently.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A power system for powering one or more loads, the power system comprising:
    a plurality of power sources electronically coupled to the one or more loads, wherein each of the plurality of power sources is in electronic communication with each other power source of the plurality of power sources, and wherein at least one of the plurality of power sources is selected from a list of: a fuel cell stack, a battery, a capacitor, a flow battery, a solar panel, and a wind turbine; and
    a plurality of power conversion systems coupled to each corresponding respective one of the plurality of power sources and wherein each of said plurality of power conversion systems includes:
        a DC to DC boost converter (DDBC) for converting power received from one or more of the plurality of power sources, the DDBC having a plurality of interleaved, isolated, fill-bridge DC-DC converters arranged in a Delta-Wye configuration and a multi-leg bridge.

2. The power system for powering one or more loads according to claim 1, wherein one of the plurality of power conversion systems is designated as a system controller and the remaining ones of the plurality of power conversion systems are designed as secondary controllers.

3. The power system for powering one or more loads according to claim 2, wherein the system controller monitors a total system load required by the one or more loads and apportions the total system load across each of the plurality of power sources by communicating with and coordinating the power conversion systems of each respective one of the plurality of power sources.

4. The power system for powering one or more loads according to claim 1, further including a system controller configured to monitor the total system load required by the one or more loads and to apportion the total system load across the individual power sources by communicating with and coordinating the other power control systems.

5. The power system for powering one or more loads according to claim 4, wherein each of the plurality of interleaved, isolated, full-bridge DC-DC converters includes a transistor and wherein the system controller controls a switching frequency of the transistor wherein each of the plurality of power conversion systems can be sized to meet maximum power requirements of the one or more loads while minimizing switching losses at lower power requirements.

6. The power system for powering one or more loads according to claim 1, wherein the DDBC has a boost ratio of greater than about 5:1.

7. The power system for powering one or more loads according to claim 1, wherein the DDBC is bi-directional.

8. The power system for powering one or ore loads according to claim 1, wherein efficiency of the DDBC increases as the DC input voltage decreases.

9. The power system for powering one or more loads according to claim 1, wherein the DDBC further includes an input current filter and a plurality of DC-AC converters, wherein the plurality of DC-AC converters are electronically coupled to the input current filter.

10. The power system for powering one or more loads according to claim 9, wherein the plurality of DC-AC converters are configured to receive a discontinuous input current.

11. The power system for powering one or more loads according to claim 9, wherein the DDBC further includes a plurality of transformers, wherein each of the plurality of transformers is electronically coupled to a corresponding respective one of the plurality of DC-AC converters.

12. The power system for powering one or more loads according to claim 11, wherein each of the plurality of transformers has a turns ratio greater than 1:5.

13. The power system for powering one or more loads according to claim 11, wherein the plurality of transformers are designed and configured to provide isolation from an electrical grid.

14. The power system for powering one or more loads according to claim 11, wherein the DDBC further includes a plurality of synchronous buck converters electrically coupled to a corresponding respective one of the plurality of transformers.

15. The power system for powering one or more loads according to claim 14, wherein the combined output of the plurality of synchronous buck converters is a continuous output current and a voltage ratio of less than one.

16. The power system for powering one or more loads according to claim 1, wherein at least one of the plurality of power sources is a fuel cell stack and another one of the plurality of power sources is selected from the list of: a battery, a capacitor, a flow battery, a solar panel, and a wind turbine.

17. A power system for powering one or more loads, the power system comprising:
a plurality of power sources electronically coupled to the one or more loads, wherein each of the plurality of power sources is in electronic communication with each other power source of the plurality of power sources, and wherein at least one of the plurality of power sources is a fuel cell stack and wherein at least one other one of the plurality of power sources is selected from a list of: a battery, a capacitor, a solar panel, and a wind turbine;
a plurality of power conversion systems coupled to each corresponding respective one of the plurality of power sources and wherein each of the plurality of power conversion systems includes:
a DC to DC boost converter (DDBC) for converting power received from one or more of the plurality of power sources, the DDBC having a plurality of interleaved, isolated, full-bridge DC-DC converters arranged in a Delta-Wye configuration and a multi-leg bridge; and
a system controller configured to monitor a total system load required by the one or more loads and to apportion the total system load across each of the plurality of power sources by communicating with and coordinating the power conversion systems of each respective one of the plurality of power sources.

18. The power system for powering one or more loads according to claim 17, wherein one of the plurality of power conversion systems is designated as the system controller and the remaining power conversion systems of the plurality of power conversion systems arc secondary controllers.

19. The power system for powering one or more loads according to claim 17, wherein each of the plurality of power sources has a useful life and wherein the system controller is configured to extend the useful life of each of the plurality of power sources by prioritizing individual power source usage and extent of usage of any individual power source.

20. The power system for powering one or more loads according to claim 17, wherein each of the plurality of interleaved, isolated, full-bridge DC-DC converters includes a transistor and wherein the system controller controls a switching frequency of the transistor wherein each of the plurality of power conversion systems can be sized to meet maximum power requirements of the one or more loads while minimizing switching losses at lower power requirements.

21. The power system for powering one or more loads according to claim 17, wherein each combination of power source and power conversion system has a power rating, and wherein each of the plurality of power sources have an initial output voltage, and wherein each DDBC is coupled to an inverter and wherein the DDBC is designed and configured to provide a continuous output current, a voltage ratio less than one, and receive a discontinuous input current.

22. The power system for powering one or more loads according to claim 21, wherein each of the plurality of power sources has a useful life and wherein the DDBC extends the useful life of each of the pluratiy of power sources.

23. The power system for powering one or more loads according to claim 22, wherein the DDBC provides the continuous output current to the inverter when a one of the plurality of power sources has a reduced output voltage, the reduced output voltage being as much as about 80% of an initial output voltage of the one of the plurality of power sources.

24. The power system for powering one or more loads according to claim 17, wherein the DDBC improves power conversion of power from a one of the plurality of power sources providing power at a low voltage as the low voltage decreases.

25. The power system for powering one or more loads according to claim 17, wherein each of the plurality of power conversion systems includes a control system, the control system designed and configured to derate a one of the power conversion systems to a lower power rating.

26. The power system for powering one or more loads according to claim 25, wherein the control system includes a control loop and a feedback loop, wherein the control loop monitors a continuous current output and a discontinuous input current and determines a power draw command based upon the continuous current output and the discontinuous input current, and wherein the feedback loop regulates a continuous current output of the DDBC.

* * * * *

UNITED STATES PATENT AND TRADEMARK OFFICE
CERTIFICATE OF CORRECTION

| | |
|---|---|
| PATENT NO. | : 9,906,039 B2 |
| APPLICATION NO. | : 15/209707 |
| DATED | : February 27, 2018 |
| INVENTOR(S) | : John Anthony Vogel and Eoin Connolly |

It is certified that error appears in the above-identified patent and that said Letters Patent is hereby corrected as shown below:

Column 11, Line 2 replace "544" with --536--.
Column 11, Line 5 and 9 replace all instances of "522" with --552--.

Signed and Sealed this
Twenty-eighth Day of August, 2018

Andrei Iancu
*Director of the United States Patent and Trademark Office*